US009828926B2

United States Patent
Shevchenko et al.

(10) Patent No.: US 9,828,926 B2
(45) Date of Patent: Nov. 28, 2017

(54) METHOD FOR DETECTING DEFECTIVE INJECTORS OF AN INTERNAL COMBUSTION ENGINE

(71) Applicant: Bayerische Motoren Werke Aktiengesellschaft, Munich (DE)

(72) Inventors: Vitaly Shevchenko, Munich (DE); Siegfried Festl, Holzkirchen (DE); Sebastian Grasreiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/090,647

(22) Filed: Apr. 5, 2016

(65) Prior Publication Data

US 2016/0215722 A1 Jul. 28, 2016

Related U.S. Application Data

(63) Continuation of application No. PCT/EP2014/073050, filed on Oct. 28, 2014.

(30) Foreign Application Priority Data

Nov. 6, 2013 (DE) .......................... 10 2013 222 556

(51) Int. Cl.
*F02D 41/22* (2006.01)
*F02D 41/00* (2006.01)
(Continued)

(52) U.S. Cl.
CPC ....... *F02D 41/221* (2013.01); *F02D 41/0087* (2013.01); *F02D 41/08* (2013.01);
(Continued)

(58) Field of Classification Search
CPC ........ F02D 41/20; F02D 41/22; F02D 41/221; F02D 41/222; F02D 41/08;
(Continued)

(56) References Cited

U.S. PATENT DOCUMENTS 6,820,593 B2 * 11/2004 Remele ............... F02D 41/0085
123/436
7,069,911 B1 * 7/2006 Kubani ............... F02D 41/0087
123/481
(Continued)

FOREIGN PATENT DOCUMENTS

DE 10 2005 044 547 A1 3/2007
DE 10 2005 049 069 A1 4/2007
(Continued)

OTHER PUBLICATIONS

International Search Report (PCT/ISA/210) issued in PCT Application No. PCT/EP2014/073050 dated Jan. 19, 2015, with English translation (six (6) pages).

(Continued)

*Primary Examiner* — Hai Huynh
(74) *Attorney, Agent, or Firm* — Crowell & Moring LLP

(57) ABSTRACT

A method for detecting defective injectors includes operating an internal combustion engine in an idling mode and deactivating mixture control of the internal combustion engine. The method also includes switching off selectively each injector of the respective injection group, detecting the change in the characteristic value when the respective injector is switched off, and checking a fault criterion. The fault criterion is satisfied when the change in the characteristic value for the respective switched-off injector exceeds or undershoots a predetermined amount. The method also includes detecting a defect in the respective injector in response to the fault criterion being satisfied.

19 Claims, 3 Drawing Sheets

(51) Int. Cl.
  *F02D 41/08* (2006.01)
  *F02D 41/20* (2006.01)
  *F02M 51/06* (2006.01)
  *F02D 41/14* (2006.01)

(52) U.S. Cl.
  CPC ......... *F02D 41/1456* (2013.01); *F02D 41/20* (2013.01); *F02M 51/06* (2013.01); *F02D 41/1443* (2013.01); *F02D 2041/224* (2013.01); *Y02T 10/40* (2013.01)

(58) Field of Classification Search
  CPC ............ F02D 41/0087; F02D 41/1456; F02D 41/1443; F02D 2041/224; F02D 2041/227; F02D 2041/228; F02M 51/06; F02M 65/00; F02M 65/006; Y02T 10/40
  USPC ................ 123/479, 490; 701/107; 73/114.45
  See application file for complete search history.

(56) References Cited

U.S. PATENT DOCUMENTS

| | | | |
|---|---|---|---|
| 8,200,415 B2* | 6/2012 | Hagel | ................. F02D 41/0087 123/435 |
| 2006/0116810 A1 | 6/2006 | Joos et al. | |
| 2008/0295487 A1 | 12/2008 | Binder et al. | |
| 2010/0251809 A1 | 10/2010 | Migueis et al. | |
| 2015/0211425 A1* | 7/2015 | Remele | ............... F02D 41/0087 73/114.45 |

FOREIGN PATENT DOCUMENTS

| | | |
|---|---|---|
| DE | 10 2008 000 567 A1 | 9/2009 |
| DE | 10 2011 005 172 A1 | 9/2012 |
| DE | 10 2007 028 900 B4 | 6/2013 |
| DE | 10 2012 204 332 A1 | 9/2013 |
| EP | 1 595 073 B1 | 7/2011 |
| EP | 2 514 954 A1 | 10/2012 |
| JP | 10-159634 A | 6/1998 |
| JP | 2012-127305 A | 7/2012 |
| WO | WO 2007/054416 A1 | 5/2007 |
| WO | WO 2014/020393 A1 | 2/2014 |

OTHER PUBLICATIONS

German Search Report issued in counterpart German Application No. 10 2013 222 556.3 dated Dec. 19, 2013, with partial English translation (ten (10) pages).

* cited by examiner

METHOD FOR DETECTING DEFECTIVE INJECTORS OF AN INTERNAL COMBUSTION ENGINE

CROSS REFERENCE TO RELATED APPLICATIONS

This application is a continuation of PCT International Application No. PCT/EP2014/073050, filed Oct. 28, 2014, which claims priority under 35 U.S.C. §119 from German Patent Application No. 10 2013 222 556.3, filed Nov. 6, 2013, the entire disclosures of which are herein expressly incorporated by reference.

BACKGROUND AND SUMMARY OF THE INVENTION

The invention relates to a method for detecting defective injectors for feeding fuel into the combustion chambers of an internal combustion engine, in particular in a motor vehicle, and to a corresponding engine test device for detecting defective injectors.

In the most contemporary diagnostic methods it is not possible to identify defective injectors in internal combustion engines without the injectors having to be removed from the engine for this purpose. Accordingly, in the case of malfunctions of an internal combustion engine which could be caused by defective injectors, these nozzles often have to be replaced based on suspicion of a fault. In many cases this leads to a situation in which an incorrect replacement of injectors occurs when there is no defect in the injectors. As a consequence, repeated repairs are necessary. In addition, the warranty costs of the engine manufacturer are increased leading to unnecessary repairs.

The object of the invention is therefore to provide a method and a corresponding engine test device with which defective injectors can be detected easily and reliably without removing the injectors from the internal combustion engine.

This and other objects are achieved by a method and an engine test device in accordance with embodiments of the invention.

Within the scope of executing the method according to the invention, the internal combustion engine is operated in the idling mode at an idling speed which is increased compared to the normal idling mode. This speed is preferably 1000 revolutions per minute or higher, in particular 1150 revolutions per minute or higher. In this way, stable operation of the internal combustion engine is ensured when the method is carried out. When the method according to the invention is carried out the injection pressure of the injectors is also preferably adjusted to a predetermined value (in particular 150 bar). In addition, during the method the mixture control of the internal combustion engine is deactivated. The mixture composed of fuel and air in the respective combustion chambers is adjusted by this control in the normal operating mode of the internal combustion engine. The adjustment of the mixture when the mixture control is activated takes place here on the basis of a characteristic value which depends on the ratio of air to fuel in the mixture and preferably increases when there is a relatively large portion of air in the mixture. The characteristic value is measured jointly for one or more injection groups composed of a plurality of injectors of the internal combustion engine, in each case for all the injectors of the corresponding injection group. By means of the joint measurement of the characteristic value for all the injectors of a respective injection group, an average characteristic value is detected for the mixture during the combustion in the combustion chambers into which the injectors of the corresponding injection group inject. The characteristic value is preferably the lambda value which is known per se and which represents the ratio of air to fuel of the mixture in comparison with a stoichiometric mixture, and to which there is usually recourse to the mixture control. The lambda value is generally determined by use of a lambda probe which is arranged, for example, in a common exhaust gas line of the combustion chambers, into which exhaust gas line the injectors of the corresponding injection group inject. The lambda probe measures the residual oxygen content in the exhaust gas in the exhaust gas line.

Within the scope of the method according to the invention, the steps a) to c) explained below are carried out in each case for at least some of the injection groups and, in particular, for all the injection groups of the internal combustion engine when the measurement of the characteristic value is activated. Although these steps are carried out when the mixture control is deactivated, the measurement of the characteristic value continues to take place. In addition it is to be noted that the designation of the steps by the letters a) to c) serves merely for better referencing of corresponding features of the steps, without necessarily a time sequence for carrying out the steps being defined as a result.

In step a) of the method, each injector of the respective injection group is switched off selectively, which indicates here and below that at a respective time or in a respective time interval only the injection of a single injector is switched off. In this case, the change in the characteristic value is detected when the respective injector is switched off. The injectors of a respective injection group are preferably switched off directly one after the other, in order to avoid fluctuations during the measurement of the characteristic value. In order to detect the change in the characteristic value, in particular the characteristic value is measured when the respective injector is switched off, and the characteristic value is measured before the respective injector is switched off (i.e. when all the injectors of the respective injection group are switched on). The change in the characteristic value represents the difference (for example the difference in absolute terms) between these characteristic values.

In step b) of the method according to the invention, a fault criterion is checked. The fault criterion is satisfied when the change in the characteristic value for the respective switched-off injector exceeds or undershoots a predetermined amount. The fault criterion is preferably checked to determine whether the predetermined amount is exceeded. In this case, the particularly relevant fault cases of injectors which inject too much fuel into the corresponding combustion chamber compared to their technical specification can be detected. Nevertheless, under certain circumstances defective injectors which inject too little fuel into the combustion chamber compared to their technical specification can also be detected with a fault criterion based on the undershooting of a predetermined amount. In step c) of the method, in the event of the fault criterion being satisfied, a defect of the respective (switched-off) injector is finally detected.

The method according to the invention is based on the realization that a relatively large or relatively small change in a characteristic value which is dependent on the mixture ratio when a respective injector is switched off makes it possible to infer abnormal operation of the injector in the corresponding injection group, with the result that in this way a defect in the switched-off injector can be detected.

The method according to the invention is preferably used for the internal combustion engine of a motor vehicle, but can, under certain circumstances, also be used for other internal combustion engines, such as, for example, ship's engines, power station engines, test bench engines and the like. With the method according to the invention it is possible to detect a wide variety of defects of injectors. In particular, the method is suitable for injectors in the form of high-pressure injectors, preferably piezo injectors, in a directly injecting internal combustion engine and, in particular, in a spark ignition engine. Basically, with the method according to the invention it is possible to detect all defects of injectors which give rise to a quantity deviation of the supplied fuel such as, for example, leaks in the injectors. In addition, the method can also be used to detect defects in injectors which do not inject directly into the combustion chamber.

In one particularly preferred embodiment, the internal combustion engine is operated before the selective switching off of the injectors until heating of one or more catalytic converters for purifying the exhaust gas of the internal combustion engine is ended. This ensures correct measurement of the characteristic values.

In a further preferred embodiment, the internal combustion engine is operated with execution of the method in the idling mode by connecting an increased load, wherein the load is connected, in particular, by activation of one or more electrical consumers of a motor vehicle which are driven by the internal combustion engine. By connecting the load, a stable speed of the engine with small fluctuations is achieved.

The fault criterion which is checked in step b) can be configured in different ways. Under certain circumstances, the predetermined amount can be a predefined value of the change in the characteristic value, the exceeding or undershooting of which satisfies the fault criterion. However, the predetermined amount can preferably be a relative amount including the characteristic values when the other injectors of the injection groups are switched off. In other words, in this case the fault criterion is satisfied in step b) when the change in the characteristic value for the respective switched-off injector relative to the change in the characteristic value when the other injectors of the respective injection group are switched off exceeds or undershoots a predetermined amount. By means of this relative amount it is possible to detect very efficiently abnormal behavior of an injector in comparison with the other injectors of the injection group, and therefore to detect a defect.

In a further refinement of the method according to the invention, the predetermined amount is given by a limiting value above 100%, wherein the fault criterion is satisfied when the percentage value of the change in the characteristic value for the respective switched-off injector with respect to the smallest change which has occurred in the characteristic value exceeds the limiting value when the respective injectors of the respective injection group are switched off. This makes it possible to detect efficiently defective injectors which are operating in a rich mode and which are injecting too much fuel compared to their specification.

In order to detect defective injectors which are operating in a lean fashion and which inject too little fuel compared to their specification, the predetermined amount is preferably given by a limiting value below 100%, wherein the fault criterion is satisfied when the percentage value of the change in the characteristic value for the respective switched-off injector with respect to the largest change which has occurred in the characteristic value undershoots the limiting value when the respective injectors of the respective injection group are switched off.

In a further variant of the method according to the invention, the predetermined amount is given by a threshold value, wherein the fault criterion is satisfied when the change in the characteristic value for the respective switched-off injector minus the changes in the characteristic value when the other injectors of the respective injection group are switched off exceeds the threshold value (in the case of defective injectors which are operating in an enriched mode) or undershoots said threshold value (in the case of defective injectors which are operating in a lean mode).

In a further preferred variant, the limiting value described above or the threshold value described above is dependent on a measured characteristic value when all the injectors of the respective injection group are switched on. This measured characteristic value is generally determined directly before the selective switching off of the injectors and used to determine the change in the characteristic value. The limiting value or the threshold value preferably increases monotonously when the measured characteristic values rise, and in the process said limiting value or threshold value also increases at least in a sub-interval of the measured characteristic values. Monotonously rising means here that the limiting value or threshold value can also remain constant in certain intervals of the characteristic values but never decreases. This variant is used, in particular, for detecting defective injectors which operate in a rich mode insofar as the characteristic value increases when there is a relatively large portion of air in the mixture. In this context, it is taken into account that in the case of relatively high characteristic values and therefore relatively lean mixtures in the normal operating mode of the internal combustion engine, enrichment (increasing the fed-in mass of fuel) of the mixture is carried out by means of the mixture control, with the result that there is a lower probability of ignition misfires and therefore of faulty operation of the engine. Under certain circumstances, in the case of rising measured characteristic values the limiting value or threshold value can also drop monotonously and in the process also decrease at least in a sub-interval of the measured characteristic values. Monotonously dropping means in this context that the limiting value or threshold value can also, under certain circumstances, be constant in certain intervals of the characteristic values, but never increases. This variant is used, in particular, for the detection of defective injectors which are operating in a lean mode, insofar as the characteristic value increases when there is a relatively large portion of air in the mixture.

In one particularly preferred variant, the method according to the invention is carried out in the cold operating mode of the injectors. In this context, such defects of injectors which occur only in the cold operating mode, such as, for example, temperature-dependent deviation of the quantity of fuel fed in via the injectors, can be detected efficiently. In order to ensure that the method also actually operates in the cold operating mode, in one preferred variant the result of the method or partial results of the method is/are categorized as invalid if a cold operating mode is not continuously present during the execution of the method. This ensures that defects which occur only in the cold operating mode are reliably detected. A cold operating mode of the injectors is preferably detected when an injector temperature is below a predetermined threshold, in particular below 50° C. The injector temperature is preferably estimated here on the basis of the temperature of the internal combustion engine at the start of the method and the time period up to the ending of the method. In particular, this estimate can also be based here on characteristic curves with a constant injector temperature, which curves are represented in a diagram as a function of the temperature of the internal combustion engine at the start of the method and the time period up to the ending of the method. On the basis of a corresponding internal combustion engine temperature and a time period, a point in the diagram is obtained which lies on one of the characteristic curves and therefore specifies the injector temperature.

The method according to the invention can also be carried out in the hot operating mode of the injectors. A hot operating mode is detected here, in particular, when no cold operating mode is detected, wherein the cold operating mode can be detected on the basis of the variant described above. Alternatively or additionally, a hot operating mode can be detected when the temperature of the coolant of the internal combustion engine exceeds a predetermined value (for example 90° C.) and/or the travel time of a motor vehicle in which the internal combustion engine is installed exceeds a predetermined time period (for example 30 min) directly before the start of the method.

The method according to the invention can, for example, firstly be carried out in the hot operating mode of the injectors, wherein in the cold operating mode the steps a) to c) of the method are subsequently carried out only for injectors for which a defect has not been detected in the hot operating mode.

The method according to the invention operates, for example, on a vehicle-external engine test device which is used, for example, in a vehicle repair workshop. The engine test device is connected in a wireless or wired fashion to the engine controller of the vehicle via a corresponding vehicle interface and can by this means control the operation of the vehicle and call measured values from the engine controller. However, it would also be conceivable for the method to operate on the engine control unit of the vehicle.

In addition to the method described above, the invention also relates to an engine test device for detecting defective injectors for feeding fuel into the combustion chambers of an internal combustion engine. The engine test device is configured to carry out the method according to the invention or one or more preferred variants of the method according to the invention. The engine test device can, for example, be the external engine test device which has already been described above and can, if appropriate, also be integrated into the vehicle.

The invention also relates to a motor vehicle having an internal combustion engine and injectors for feeding fuel into the combustion chambers of the internal combustion engine, wherein the motor vehicle comprises the engine test device described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
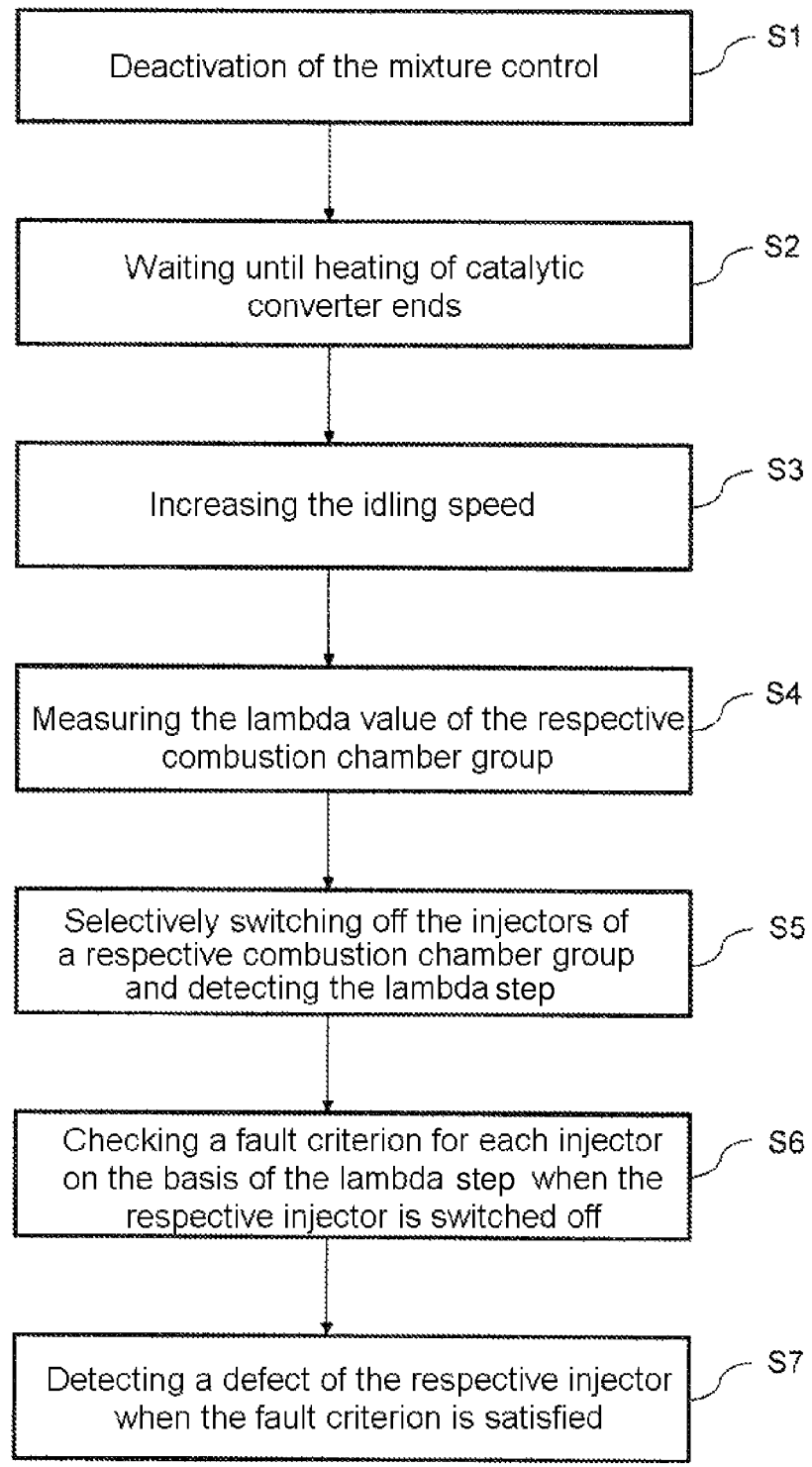
FIG. 1 is a flow chart which represents the steps of an embodiment of the method according to the invention.

An exemplary embodiment of the invention will be described below on the basis of the detection of injectors in the form of high-pressure injectors which inject fuel directly into the combustion chambers of the cylinders of a motor vehicle engine. The injectors here are piezo injectors whose injector nozzles open as a result of the application of electrical voltage to a piezo material in the injector. The injectors also include a temperature compensator with an oil reservoir, wherein different degrees of expansion of the housing of the injector and of the piezo material are compensated by this temperature compensator by means of the oil thereof. In this context, a defect of the injector can occur to the effect that the oil gels, which results in the different expansion of the injector housing and piezo material no longer being able to be compensated. This leads, in turn, under cold ambient conditions to an injector which operates in an enriched mode and injects too much fuel into the combustion chamber. Generally, when there is an absence of temperature compensation it is also possible to assume deviations of the quantities of the injector with respect to its specification.

It is to be noted here that the defect of the injector owing to gelling when it is operating in an enriched mode occurs only at low temperatures of the engine or of the injector. In other words, this defect of gelling can therefore be detected only in the cold operating mode of the engine or injector. Accordingly, the embodiment described below is carried out in the cold operating mode in order to detect these defects. However, irrespective of this, other defects of the injector which occur both in the cold operating mode and in the hot operating mode of the engine, such as for example a lack of tightness of the injector (for example a leak at its tip), are also detected in the cold operating mode. If appropriate, the method described below can also be carried out analogously in the hot operating mode of the engine or injector, in which case, however, defects owing to incorrect behavior of the temperature compensator in the cold operating state are not detected. As has already been mentioned above, the cold operating mode of the engine or the injectors can be detected, for example, on the basis of the engine temperature when the test method starts and the time period up to the ending of the method, wherein the method is then ended if a lambda step has been detected for all injectors of the internal combustion engine when they switch off, as is explained in more detail below.

In one preferred variant, empirically determined characteristic curves are defined as a function of the engine temperature at the start of the method and duration of the method, wherein each characteristic curve is assigned to a fixed injector temperature. In this context, the characteristic curve to which a specific engine temperature belongs at the start of the method and a time period up to the ending of the method are determined. Since an injector temperature belongs to each characteristic curve, this results in an estimated injector temperature. If this estimated injector temperature is below a specific threshold value, for example below 50° C., a cold operating mode is detected. If, in contrast, a temperature of the injectors when the method ends is above the threshold value, the result of the method is rejected or is interpreted as a hot test, since it is then no longer ensured that injector defects which occur only in the cold operating mode have been reliably detected.

The execution of a variant of the method according to the invention will be explained with reference to FIG. 1. The test method described below is carried out here by means of an engine test device which is connected via a vehicle interface to the engine controller and can control the operation of the vehicle and/or call measured values from the engine controller. The test method is explained on the basis of the checking of injectors in a six-cylinder internal combustion engine with six combustion chambers, wherein each combustion chamber comprises an individual injector for injecting fuel, and there are two combustion chamber groups each composed of three combustion chambers and therefore three injectors. The lambda value which has already been described above, and which represents the ratio of air to fuel of the mixture in the combustion chambers in comparison with a stoichiometric mixture, is determined for each combustion chamber group by use of a single lambda probe which is arranged in a common exhaust gas pipe for the three combustion chambers. As is generally known, a lambda value of 1 corresponds to the stoichiometric mixture, while lambda values greater than 1 represent relatively lean mixtures with a relatively large portion of air during the combustion, and lambda values less than 1 represent rich mixtures with a relatively small portion of air during the combustion. The lambda value which is determined by use of the corresponding lambda probe is used for mixture control in the normal operating mode of the internal combustion engine. Although the mixture control is deactivated within the scope of the test method according to the invention, corresponding measurements of lambda values continue to be carried out by the lambda probes in order to detect defective injectors by this means.

Although the method of the invention is explained with reference to a six-cylinder engine, the method can also be used in the same way for internal combustion engines with a different number of cylinders provided that the lambda value is detected for a plurality of injectors or combustion chambers by use of a respective lambda probe. For example, the method can also be used for a four-cylinder engine in which a respective lambda probe is provided for two cylinders. Likewise, the method can be used for an eight-cylinder engine in which case the lambda value is respectively detected for a combustion chamber group composed of four cylinders by use of a lambda probe.

At the start of the method, after the internal combustion engine has started, the mixture control thereof is first deactivated in step S1 of FIG. 1. In order to keep measurements unfalsified, in step S2 the system waits until the heating of the catalytic converter of the internal combustion engine is ended. In step S3, the speed of the internal combustion engine, which is first operating at the normal idling speed, is finally increased in order to ensure a stable speed during the testing of the injectors of the internal combustion engine. In particular, the speed is adjusted to a speed value of 1200 revolutions per minute or higher. In step S3, the injection pressure of the injectors is preferably adjusted to a predetermined value (for example 150 bar). In a downstream optional step, which is not represented in FIG. 1, the internal combustion engine is connected to a load, as a result of which fluctuations in the idling speed, which can occur in the case of a low load and in the case of mixture deviations from the setpoint state, are avoided. In order to connect an electrical load indirectly, one or more electrical consumers in the vehicle, such as, for example, the air-conditioning system, the rear windshield heater, the electric fan of the radiator and the like, are actuated.

In the following steps S4 to S7, the actual execution of the test method takes place, wherein these steps are carried out in separate time intervals for each of the two combustion chamber groups. In step S4, the lambda value of the respective combustion chamber group is firstly measured by use of the lambda probe which is assigned to the combustion chamber group. Subsequently, in step S5 the individual injectors of the combustion chamber group are selectively switched off and the resulting lambda step is determined for each switched-off injector, wherein the injectors of a combustion chamber group are switched off directly one after the other in order to avoid fluctuations in the lambda value. The lambda value is therefore measured when the respective injector is switched off, and the lambda value which was determined in step S4 is subtracted from this measured value. Since the switching off of the respective injectors brings about an increase in the portion of air in the combustion, the lambda value increases when the injectors are switched off, i.e. the lambda step is positive. After the lambda steps of the respective switched-off injectors have been determined, in step S6 a fault criterion for each injector is finally checked on the basis of the lambda jump which has resulted when the respective injector was switched off. Finally, in step S7 a defect of the respective injector is detected insofar as the fault criterion is satisfied.

As is explained in more detail below, the fault criterion is configured in such a way that in the case of a relatively large lambda jump when the corresponding injector is switched off compared to the other injectors, a defect is detected. In this context the embodiment of the method which is described here serves to detect injectors which operate in a deviating enriched fashion and which inject too much fuel in the cold operating mode. When the motor vehicle is traveling with a cold engine, such injectors create a fuel mixture which is too rich, in response to which the mixture control measures an excessively low lambda value by means of the lambda probe and subsequently reduces the injection of all the injectors of the corresponding combustion chamber group, which in turn creates ignition misfires of such injectors of the combustion chamber group which are not operating in too enriched a fashion and are satisfactory. Conventionally this brings about a situation in which when ignition misfires occur the incorrect injectors are replaced. In contrast to this, the injector which is operating in an enriched fashion and which can be a cause of ignition misfires in the cold operating mode is detected with the test method described here.

The test method according to the invention and the fault criterion described above are explained below once more in detail with reference to FIG. 2. This figure shows a time diagram with the time t as the abscissa, wherein the determined lambda values λ are illustrated in the upper part of the diagram along the ordinate, and the corresponding lambda steps Δλ are represented in the lower part of the diagram along the ordinate. The reference symbols G1 and G2 denote the two combustion chamber groups of the six-cylinder engine under consideration. The combustion chamber group G1 comprises here the three cylinders or combustion chambers Z1, Z2 and Z3, whereas the combustion chamber group G2 comprises the three cylinders or combustion chambers Z4, Z5 and Z6. According to FIG. 2, these reference symbols also correspond to time intervals in which measurements for the individual combustion chambers or combustion chamber groups are carried out. Within the scope of the method in FIG. 2, the lambda steps Δλ are firstly determined for the combustion chamber group G1 and subsequently for the combustion chamber group G2. The line L1 represents here the measured lambda values for the combustion chamber group G1, and line L2 represents the measured lambda values for the combustion chamber group G2. In the internal combustion engine under consideration, the injectors of the cylinders Z1 to Z5 are working satisfactory, whereas the injector of the cylinder Z6 is a defective injector which is operating in too enriched a fashion in the cold operating mode under consideration, and is therefore injecting too much fuel.

Firstly, in the time interval G1 the lambda value is determined by means of the corresponding lambda probe of the combustion chamber group G1 for all the switched-on injectors of the cylinders Z1 to Z3. The time interval G1 is approximately 20 sec here, wherein lambda values measured within this time interval are averaged. Subsequently, lambda values are determined in corresponding time intervals Z1 to Z3 in a way analogous to the time interval G1, wherein these time intervals are also in the region of 20 sec. In the time interval Z1, the injector of the cylinder Z1 is switched off here, in the time interval Z2 the injector of the cylinder Z2 is switched off, and in the time interval Z3 the injector of the cylinder Z3 is switched off. Owing to the switching off of the respective injectors, this brings about an increase in the lambda value of approximately 1.0 to 1.25, as is indicated by the line L1. In addition, the lambda step $\Delta\lambda$ is determined for the individual switched-off injectors, as is indicated in the lower part of the diagram. Since all the injectors are satisfactory and essentially inject the same quantity of fuel, the lambda steps are approximately the same size and are in the range between 0.30 and 0.35.

The measurements described above are repeated in an analogous fashion for the second combustion chamber group G2, wherein in turn the lambda value is firstly measured for all the switched-on injectors of the cylinders Z4 to Z6 in the time interval G2, and the individual injectors of the cylinders Z4 to Z6 are finally switched off successively, in order to determine the resulting lambda steps. Since the injector of the cylinder Z6 is operating in too enriched a fashion, the lambda value which is determined in the time interval G2 is smaller than the lambda value in corresponding time intervals G1. In particular, the value in the time interval G2 is approximately 0.80. Since the injection of the cylinder Z6 feeds the most fuel in comparison with the injectors of the cylinders Z4 and Z5, the switching off of this defective injector Z6 brings about a larger lambda step $\Delta\lambda$ than for the non-defective injectors of the cylinders Z4 and Z5. As is apparent from FIG. 2, the lambda jumps are in the region of 0.2 when the injectors of the cylinders Z4 and Z5 are switched off, whereas the lambda jump when the injector of the cylinder Z6 is switched off is significantly larger and is 0.45.

Figure 3:
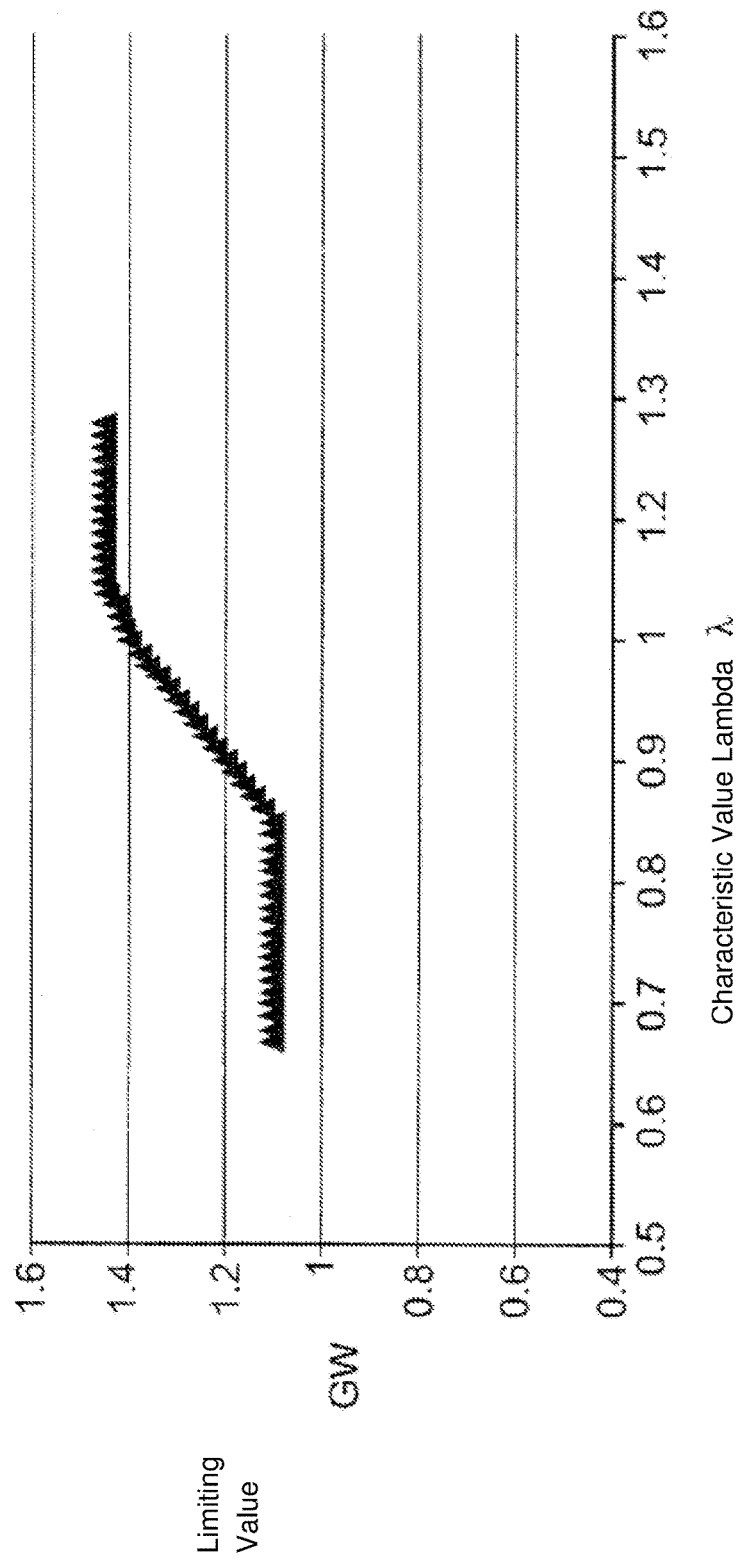
FIG. 3 is a graphical diagram which represents the dependence of a limiting value for determining faulty injectors on a measured lambda value according to an embodiment of the invention.

In the embodiment described here, the percentage value of the lambda jump when the cylinder Z6 is switched off is determined with respect to the smallest lambda jump of the combustion chamber group G2 in order to detect the defective injector of the cylinder Z6. The smallest lambda jump occurs when the cylinder Z4 is switched off. In other words, the lambda jump when the injector of the cylinder Z6 is switched off is placed in a ratio with the lambda jump when the cylinder Z4 is switched off. This results in a relative value of greater than 1, which corresponds to a percentage value of more than 100%. In this context, within the scope of the fault criterion a limiting value is defined which corresponds to a percentage value of more than 100%. If this limiting value is exceeded by the percentage value of the lambda jump, the injector with this lambda jump is detected as being defective. In the exemplary embodiment in FIG. 3, the limiting value is approximately 1.1, and therefore 110%. This limiting value is clearly exceeded by the percentage value of the lambda jump of the injector of the cylinder Z6 which is approximately 0.45/0.2=225%. In contrast, the percentage value of the lambda jump of the injector of the cylinder Z5 remains below the limiting value. Therefore, in fact only the defective injector of the cylinder Z6 which is operating in too enriched a fashion is detected.

Figure 2:
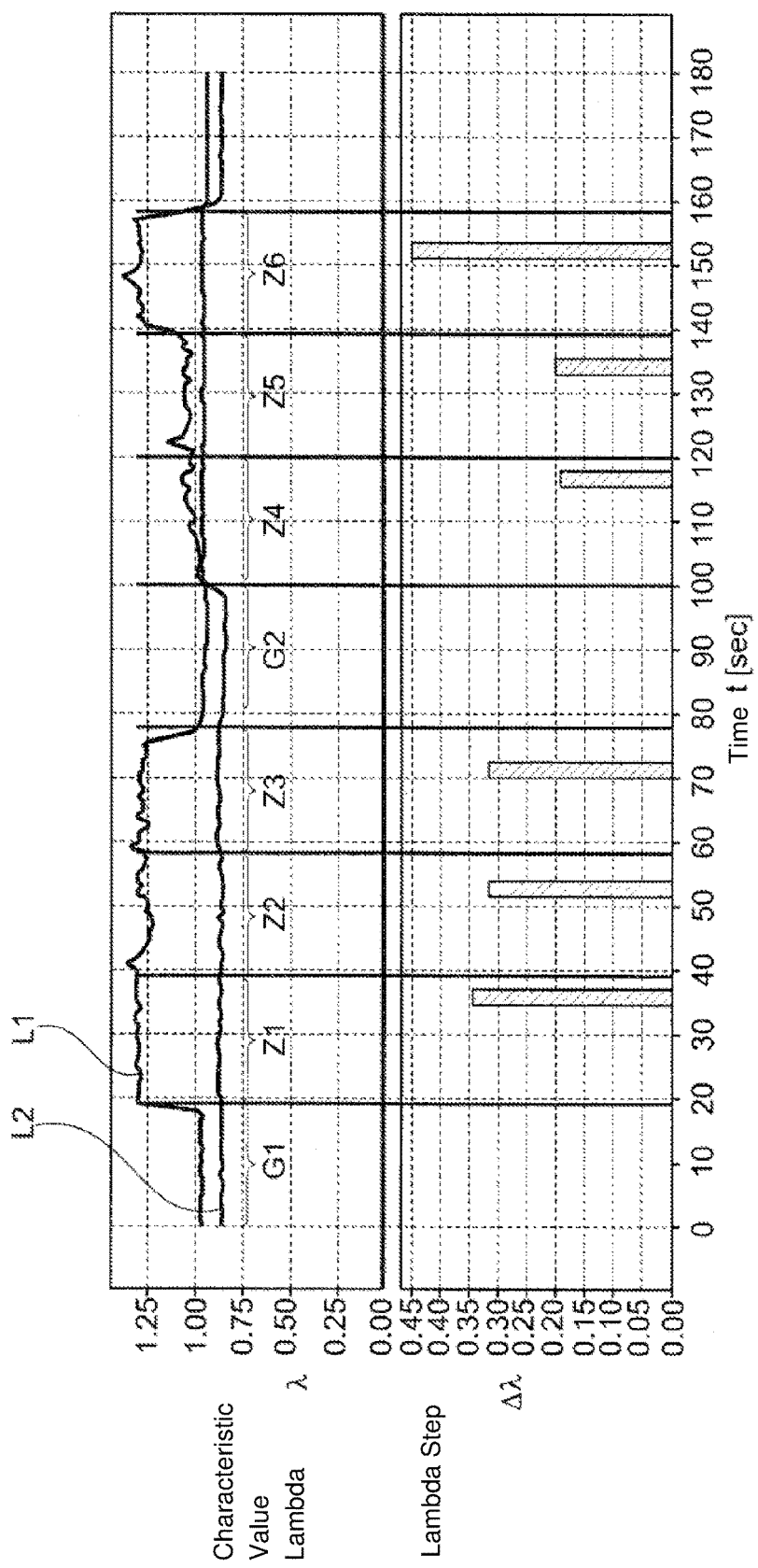
FIG. 2 is a graphical diagram which clarifies the detection of a faulty injector in an internal combustion engine with six cylinders based on a variant of the method according to the invention.

In a further preferred embodiment, there is also the possibility of the limiting value which has just been described being made dependent on the lambda value which is determined for the respective combustion chamber group in the switched-on state of all the injectors, i.e. in the corresponding time intervals G1 and G2 in FIG. 2. For example, a possible dependence of the limiting value on the lambda value is indicated in the diagram in FIG. 3. In this context, the lambda values $\lambda$ are represented along the abscissa, and the limiting values GW along the ordinate. The relationship between the lambda values and the limiting values GW is monotonously rising here, i.e. the limiting values never decrease when there are rising values of $\lambda$ but rather remain constant and also increase in a sub-interval. This sub-interval is between lambda values of approximately 0.85 and 1.05 in the example in FIG. 3. As a result of the increase of the limiting value GW in the case of rising lambda values, the test method becomes more fault-tolerant in the case of relatively large lambda values and therefore relatively lean mixtures. It is taken into account here of the fact that in the normal operating mode when the mixture control is switched on a relatively lean mixture is fed automatically in order to enrich it, with the result that there is a lower probability of ignition misfires occurring than is the case with a rich mixture which is made leaner within the scope of the mixture control.

Since the method is carried out in the cold operating mode, it can be used to detect defects of injectors which occur only in the cold operating mode, in particular the faulty behavior of the thermo-compensator explained at the beginning. Nevertheless, the method also detects defective injectors which are operating in too enriched a fashion both in the cold operating mode and in the hot operating mode of the engine because they have, for example, continuous leaks in addition to the fuel masses which they are injecting.

The defective injectors which are detected within the scope of the test method are indicated to the operator via a corresponding user interface of the engine test device. The operator can also initiate replacement of the injectors. As already mentioned, the method can, if appropriate, also be carried out in the case of a warm engine. In this case, it is, however, not possible to detect such defective injectors which do not function correctly only in the cold operating mode. If the method is carried out in an engine workshop, the testing of the engine is usually firstly carried out when the engine is warm, since when the vehicle is brought in the internal combustion engine has generally already been operated for a relatively long time by the customer and can therefore be classified as a hot state. The defective injectors which are detected in this context can be replaced immediately. At a later time, after the internal combustion engine has cooled, the method is carried out once more by the workshop in the cold operating mode of the engine. If further defective injectors are detected in this context, they are also replaced.

The embodiment of the method according to the invention which is described above has a series of advantages. In particular, a robust and objectified test is provided with which it is possible to check whether injectors in an internal combustion engine have a malfunction. For this purpose, the injectors do not have to be removed from the engine but can instead be checked during the operating time of the engine. It is therefore no longer necessary to replace the injectors on suspicion of a defect in the case of malfunctions of the internal combustion engine which may be caused by defective injectors. In particular, the method according to the invention can be used to detect reliably whether malfunctions of an engine are actually caused by defective injectors, with the result that replacement has to be carried out only in the case of a defect, and as a result repeated repairs are avoided and warranty costs are reduced.

REFERENCE SYMBOLS

S1, S2, . . . , S7 Steps
G1, G2 Combustion chamber groups
Z1, Z2, . . . , Z6 Cylinders
L1, L2 Lines
t Time
$\lambda$ Lambda value
$\Delta\lambda$ Lambda step
GW Limiting value FIG. 1

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting defective injectors that feed fuel into combustion chambers of an internal combustion engine, the method comprising:
   operating the internal combustion engine in an idling mode with an idling speed that is increased in comparison to a normal idling mode, and with a predetermined injection pressure,
   deactivating mixture control of the internal combustion engine, said mixture control in a normal operating mode of the internal combustion engine adjusting a mixture of fuel and air in respective combustion chambers based on a characteristic value ($\lambda$) which depends on a ratio of air to fuel in the mixture and which is measured jointly for one or more injection groups composed of a plurality of the injectors of the internal combustion engine, for all injectors of an injector group,
   carrying out the following steps for at least some of the injection groups with activated measurement of the characteristic value ($\lambda$):
   a) switching off selectively each injector of the respective injection group (G1, G2), and detecting the change ($\Delta\lambda$) in the characteristic value ($\lambda$) when the respective injector is switched off;
   b) checking a fault criterion, said fault criterion being satisfied when the change ($\Delta\lambda$) in the characteristic value ($\lambda$) for the respective switched-off injector exceeds or undershoots a predetermined amount; and
   c) detecting a defect in the respective injector in response to the fault criterion being satisfied, and indicating to an operator that the defect in the respective injector was detected, wherein
   at least one of the preceding steps is carried out using an electronic controller.

2. The method according to claim 1, wherein the method is carried out for injectors comprising high-pressure injectors in a direct injection internal combustion engine.

3. The method according to claim 2, wherein the high-pressure injectors are piezo injectors.

4. The method according to claim 1, wherein the idling speed is increased to 1,000 rpm or more.

5. The method according to claim 4, wherein the idling speed is increased to 1,150 rpm or more.

6. The method according to claim 1, wherein the characteristic value ($\lambda$) is the lambda value representing the ratio of air to fuel in the mixture in comparison with a stoichiometric mixture.

7. The method according to claim 1, wherein the fault criterion is satisfied in step b) when the change in the characteristic value for the respective switched-off injector relative to changes in the characteristic value when the other injectors of the respective injection group are switched off exceeds or undershoots a predetermined amount.

8. The method according to claim 1, wherein:
   a) the predetermined amount is given by a limiting value (GW) above 100%, and the fault criterion is satisfied when a percentage value of the change in the characteristic value ($\lambda$) for the respective switched-off injector with respect to a smallest change ($\Delta\lambda$) which has occurred in the characteristic value ($\lambda$) exceeds the limiting value when the respective injectors of the respective injection group (G1, G2) are switched off, or
   b) the predetermined amount is given by a limiting value (GW) below 100%, and the fault criterion is satisfied when the percentage value of the change in the characteristic value ($\lambda$) for the respective switched-off injector with respect to a largest change ($\Delta\lambda$) which has occurred in the characteristic value ($\lambda$) undershoots the limiting value when the respective injectors of the respective injection group (G1, G2) are switched off.

9. The method according to claim 8, wherein
   the predetermined amount is given by a threshold value, and the fault criterion is satisfied when a change ($\Delta\lambda$) in the characteristic value ($\lambda$) for the respective switched-off injector minus changes in the characteristic value ($\lambda$) when the other injectors of the respective injection group (G1, G2) are switched off exceeds or undershoots the threshold value.

10. The method according to claim 9, wherein
    the limiting value (GW) or the threshold value depends on a measured characteristic value ($\lambda$) when all the injectors of the respective injection group (G1, G2) are switched on, wherein the limiting value (GW) or the threshold value increases monotonously when the measured characteristic values ($\lambda$) rise, and in the process said limiting value (GW) or said threshold value also increases at least in a sub-interval of the measured characteristic values.

11. The method according to claim 1, wherein the method is carried out in a cold operating mode of the injectors.

12. The method according to claim 11, wherein in an event that the cold operating mode is not continuously present during execution of the method, a result of the method is categorized as invalid.

13. The method according to claim 11, wherein:
    the cold operating mode of the injectors is detected when an injector temperature is below a predetermined threshold, and
    the injector temperature is estimated based on a temperature of the internal combustion engine at a start of the method and a time period up to an end of the method.

14. The method according to claim 13, wherein the predetermined threshold is below 50° C.

15. The method according to claim 1, wherein
the method is carried out in a hot operating mode of the injectors, wherein a hot operating mode is detected when:
no cold operating mode is detected, and/or
when a temperature of coolant of the internal combustion engine exceeds a predetermined value and/or a travel time of a motor vehicle in which the internal combustion is installed exceeds a predetermined time period directly before the start of the method.

16. The method according to claim 1, wherein the method is carried out for detecting defective injectors of an internal combustion engine installed in a motor vehicle.

17. An engine test device for detecting defective injectors for feeding fuel into combustion chambers of an internal combustion engine, comprising:
a controller that:
operate the internal combustion engine in an idling mode with an idling speed that is increased in comparison to a normal idling mode, and with a predetermined injection pressure,
deactivate mixture control of the internal combustion engine, said mixture control in a normal operating mode of the internal combustion engine adjusting a mixture of fuel and air in respective combustion chambers based on a characteristic value (λ) which depends on a ratio of air to fuel in the mixture and which is measured jointly for one or more injection groups composed of a plurality of the injectors of the internal combustion engine, in each case for all injectors of an injection group,
wherein for at least some of the injection groups with activated measurement of the characteristic value (λ) the controller is also configured to:
a) switch off selectively each injector of the respective injection group (G1, G2), and detect the change (Δλ) in the characteristic value (λ) when the respective injector is switched off;
b) check a fault criterion, said fault criterion being satisfied when the change (Δλ) in the characteristic value (λ) for the respective switched-off injector exceeds or undershoots a predetermined amount; and
c) detect a defect in the respective injector in response to the fault criterion being satisfied, and
a user interface that indicates to an operator that the defect in the respective injector was detected.

18. The engine test device according to claim 17, wherein the internal combustion engine is installed in a motor vehicle.

19. A motor vehicle, comprising:
an internal combustion engine having injectors for feeding fuel into combustion chambers of the internal combustion engine;
an engine test device including a controller that detects defective ones of the injectors, wherein the engine test device is configured to:
operate the internal combustion engine in an idling mode with an idling speed that is increased in comparison to a normal idling mode, and with a predetermined injection pressure,
deactivate mixture control of the internal combustion engine, said mixture control in a normal operating mode of the internal combustion engine adjusting a mixture of fuel and air in respective combustion chambers based on a characteristic value (λ) which depends on a ratio of air to fuel in the mixture and which is measured jointly for one or more injection groups composed of a plurality of the injectors of the internal combustion engine, in each case for all injectors of an injection group, and
for at least some of the injection groups with activated measurement of the characteristic value (λ), the engine test device is also configured to:
a) switch off selectively each injector of the respective injection group (G1, G2), and detect the change (Δλ) in the characteristic value (λ) when the respective injector is switched off;
b) check a fault criterion, said fault criterion being satisfied when the change (Δλ) in the characteristic value (λ) for the respective switched-off injector exceeds or undershoots a predetermined amount; and
c) detect a defect in the respective injector in response to the fault criterion being satisfied; and
d) indicate to an operator that the defect in the respective injector was detected.

* * * * *